Oct. 26, 1943.    T. W. GASSER    2,332,631
GUN CHARGER
Filed Oct. 17, 1939    4 Sheets-Sheet 1

INVENTOR

Oct. 26, 1943.　　　　T. W. GASSER　　　　2,332,631
GUN CHARGER
Filed Oct. 17, 1939　　　　4 Sheets-Sheet 3

INVENTOR
Thos. Wm Gasser

Oct. 26, 1943.        T. W. GASSER        2,332,631
GUN CHARGER
Filed Oct. 17, 1939        4 Sheets-Sheet 4

INVENTOR
Tho. W. Gasser

Patented Oct. 26, 1943

2,332,631

UNITED STATES PATENT OFFICE 2,332,631

GUN CHARGER

Thomas W. Gasser, Glendale, Calif., assignor to Lockheed Aircraft Corporation, Burbank, Calif.

Application October 17, 1939, Serial No. 299,850

8 Claims. (Cl. 89—1)

The present invention relates to aircraft armament and is particularly concerned with the provision of a compact mechanism comprising a single charging handle associated with selective means by which any one or all of a group of guns may be individually cleared of jam or charged. It is to be understood that this invention is most advantageously applied to the remote control of machine guns in aircraft or other vehicles and can be readily designed to accommodate any number of guns.

The breech bolts of machine guns are reciprocable during gun operation and in order to initially load such guns and/or correct stoppages therein, it is necessary to manually reproduce the breech bolt action. It has been common practice when mounting guns of this type in aircraft to locate the guns such that they are readily accessible to the operator or gunner and to provide a separate charging means for each gun. However, the more modern military aircraft are usually provided with one or more fixed guns located in the wings, the landing gear fairing or the fuselage, which locations are somewhat remote to the gunner, and it is, therefore, necessary to provide a means for the remote control or operation of said guns. Since the space within which the gunner must operate is usually limited to a minimum, it is highly desirable to provide a single compact mechanism by which said gunner can operate all of the guns on the aircraft; that is, a mechanism by which any gun can be individually charged or cleared of jam by merely selecting the gun and operating the charging mechanism. The invention described herein has solved this problem which has long confronted designers of aircraft armament in a simple, practical and economical manner.

The drawings which form a part of this specification and which will be hereinafter described, illustrate what I now consider to be the preferred design of a gun charging mechanism for the operation of four guns, however, it is to be clearly understood that my invention is not to be limited to a four gun arrangement.

It is, therefore, the primary object of this invention to provide a method, apparatus or mechanism which enables the operator to select, individually clear, clear of jam or charge, any one or all of a group of guns. When one gun is cleared or charged the selector dial may be rotated to a second or third gun and so on until all the guns are cleared or charged and ready for use.

It is also an object of this invention to provide a means for locking the breech bolt of the gun in its rear position for the purpose of loading, servicing or repairing the gun or to prevent any chance of accidental discharge. With the breech bolt thus locked the charging handle may be returned to its original position, thus consuming a minimum amount of valuable space.

Another object of this invention is the provision of a charging mechanism which will satisfactorily operate guns of various sizes, i. e., guns having different lengths of breech bolt travel.

Another object of this invention is to provide the operator with a high mechanical advantage during the first increment of charging arm or breech bolt travel.

Further objects and advantages of this invention will be made evident throughout the following part of this specification. It is to be understood that the full scope and spirit of the invention is to be enjoyed herein and that I am not to be limited to the specific arrangement shown in the accompanying drawings.

In order that the operation and principle of my invention may be better understood, a detailed description will be given herein, reference being made to the accompanying drawings, in which.

Figure 1:
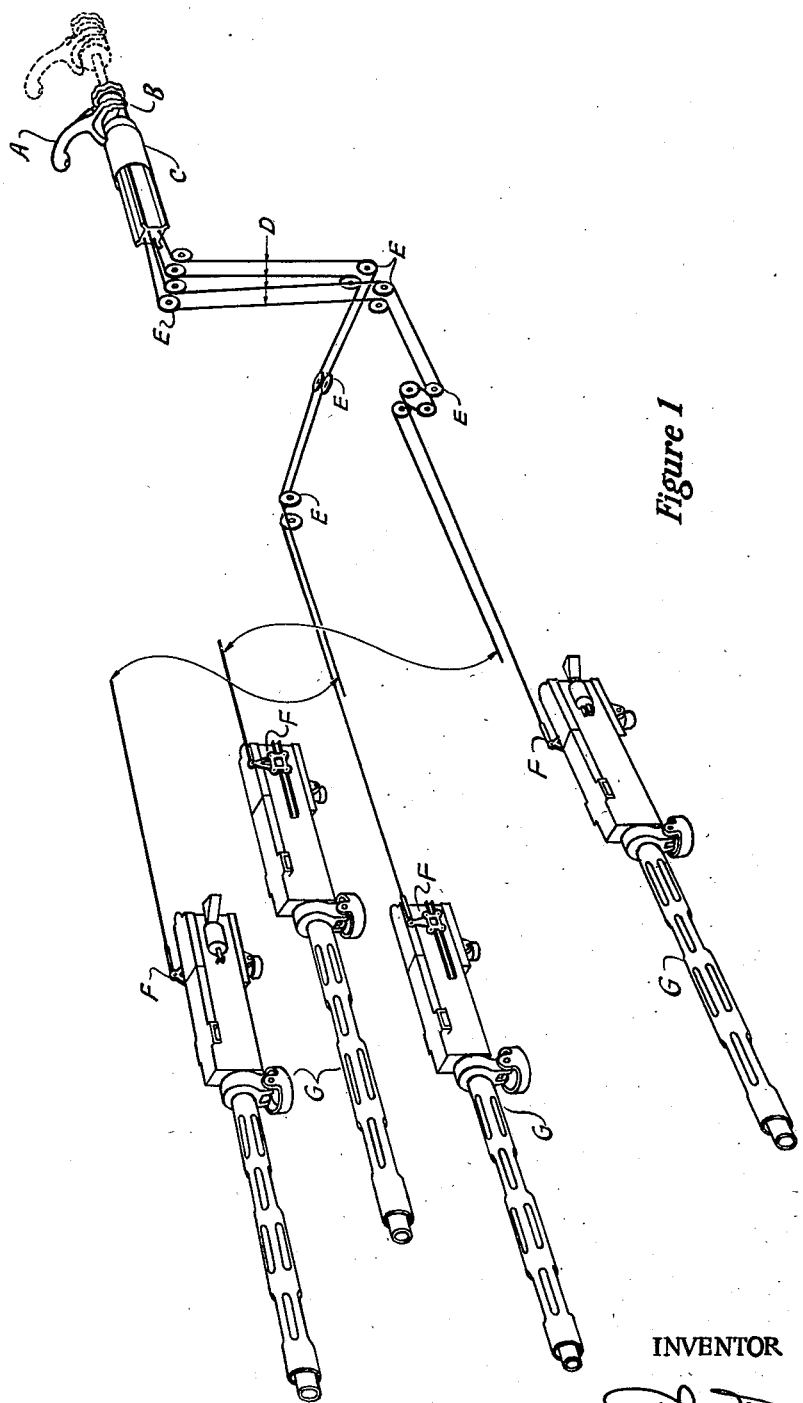
Figure 1 is a perspective view showing the general relation of the gun charger unit to the guns.
Figure 2:
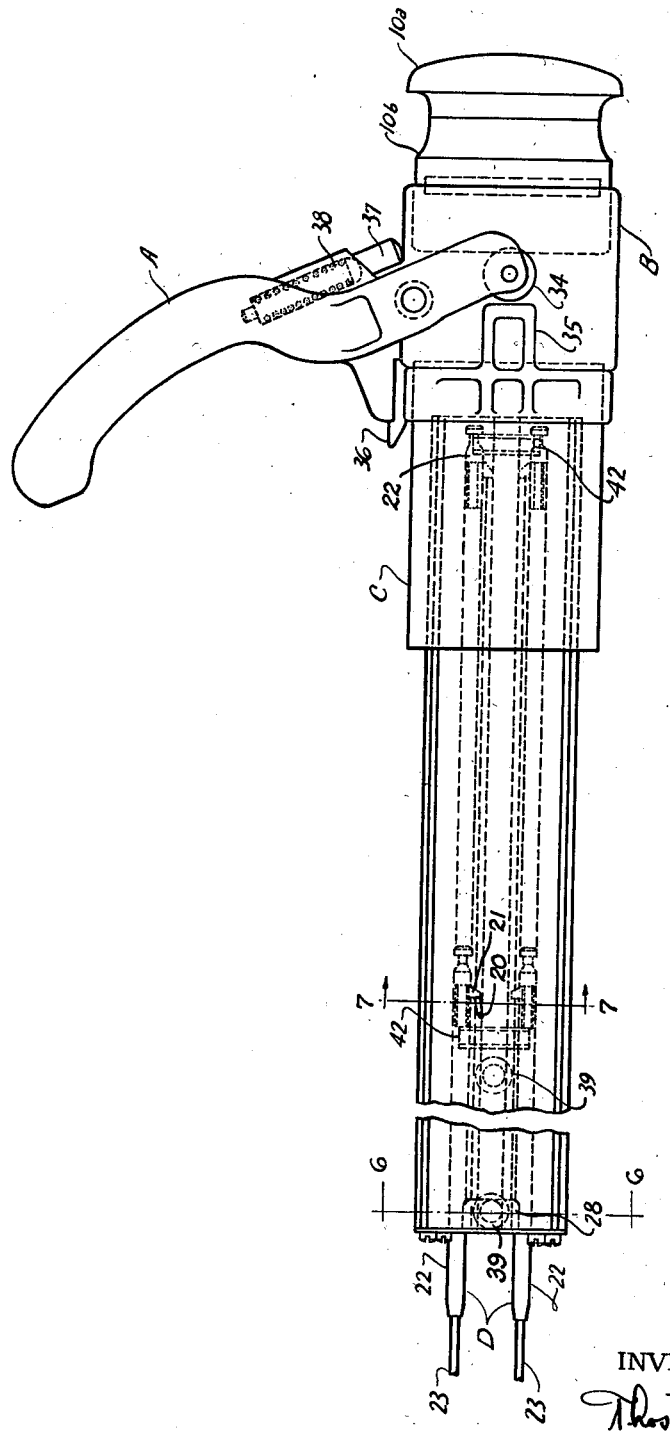
Figure 2 is a more detailed view of the complete gun charger unit, showing the cable mechanisms at both extremes of their movement.
Figure 3:
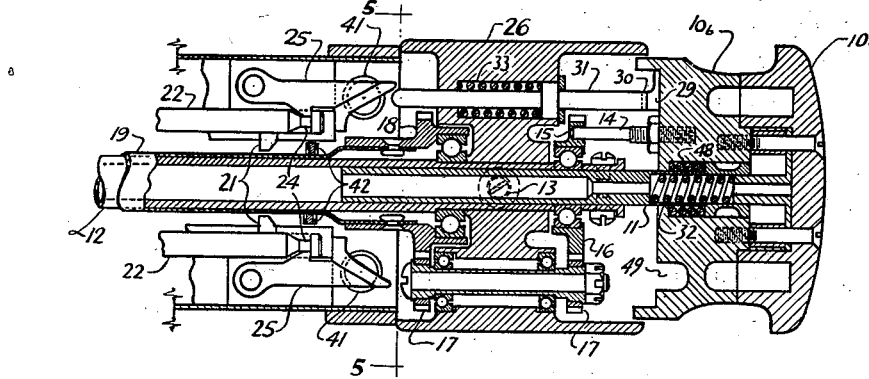
Figure 3 is a cross-section of the charger head as indicated by line 3—3 of Figure 4.
Figure 4:
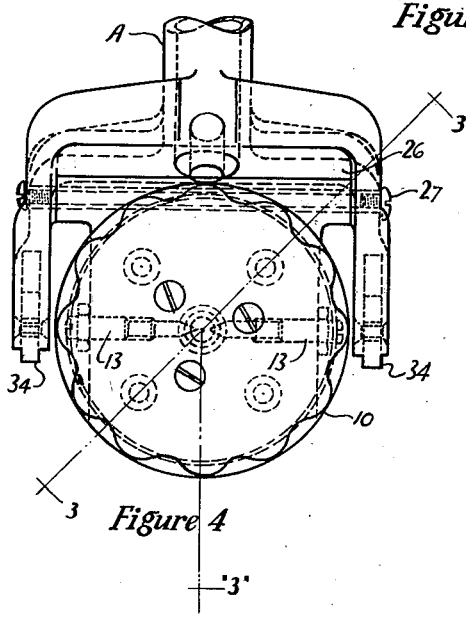
Figure 4 is an end view of the charger head indicating other details of my preferred construction.
Figure 5:
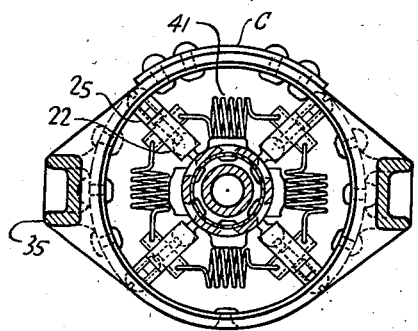
Figure 5 is a cross-sectional view as indicated by line 5—5 of Figure 3 and showing the arrangement of the latch mechanism within the support structure.

The invention as described in this specification and illustrated by the drawings consist primarily of a charger handle A, a charger head unit B, charger support structure or frame C and cable and slide rod assemblies D. The cable portions of the assemblies D (see Figure 1) are passed over the pulleys E and attached to the charging arms F which operate the reciprocable breech bolts (not shown) of the guns G. Means incorporated within the charger head unit B and support structure C, as will be hereinafter described, for engaging the handle A and head unit B with the desired cable and slide rod assembly D, allow the gunner to clear, clear of jam, or charge any one or all of said guns G, by merely selecting the desired gun and drawing the charger handle A to the rear position as indicated by the dotted outline in Figure 1.

Figure 6:
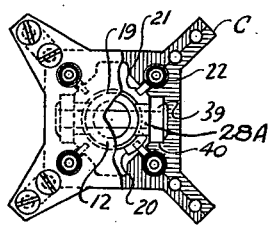
Figure 6 is an end view of the charger partially cut away on the line 6—6 of Figure 2 to show the roller and track arrangement within the support structure.

The selector dial 10, which I have shown as constructed of two parts a and b, is rotatably mounted on the spindle 11 which in turn is rigidly supported within the tube 12 and secured therein by means of screws 13. When the selector dial 10 is rotated, the finger 14 secured thereto and engaging the hole 15 of the gear 16, rotates said gear 16 which in turn imparts a corresponding rotation to the gear 18 and sleeve 19 by means of idler gears 17, thus bringing the dog 20 (see Figure 6) into engagement with the lug 21 on the slide rod 22 which, by means of the cable 23, is connected to the reciprocable breech bolt of the gun G desired to be cleared or charged.

The gunner, by grasping the handle A and drawing same to the rear, may thereby operate the reciprocable breech bolt of the gun G as desired. When the handle A is drawn to the rear, the dog 20 bears against the lug 21 on the slide rod 22, same being pulled rearwardly until the groove 24 thereon is engaged by the latch 25, thus retaining the reciprocable breech bolt in its most rearward position and clearing the gun G after which the handle A may be returned to its former position. It will be understood that the operating force is transmitted from the handle A to the head frame 26 by means of the bolt 27 and thus to the tube 12 through the screws 13, said tube 12 transferring the force to the sleeve 19 and the dog 20 thereon by means of a collar 28 secured to the tube 12 at its forward end. It is to be noted that in Figure 6 I have replaced the collar 28 with the spacers 28a, and that same are to be considered as a preferred alternate design.

On the rear side of the selector dial 10 I have provided a cam 29 with a stop 30 thereon which interlocks with the release plunger 31. When it is desired to charge the gun the gunner pushes forward on the selector dial 10 thus compressing the springs 32 and 33 and moving the release plunger 31 to release the slide rod 22. The slide rod 22, powered by the breech bolt of the gun G, then shifts forward to its original position, at which time said gun is charged and ready to be fired. Positive action of the latch 25 is insured by the springs 41. It will, of course, be understood that separate release plungers 31 are provided for each of the guns G.

At the lower ends of the handle A there are provided rollers 34, which contact and bear against a stationary frame support 35, thereby acting as a lever and providing the gunner with a high mechanical advantage during the first increment of breech bolt movement. This leverage is advantageous in that when the gun is jammed, considerable force is required to eject the fired cartridge case from the chamber. The charging head B is maintained in its forward position by means of the catch 36 which is held in locked position by the plunger 37 and spring 38. It will also be understood that the head unit B is guided and prevented from rotating or turning about the axis of the tube 12 by the rollers 39, tracks 40 and bearings 42.

Figure 8:
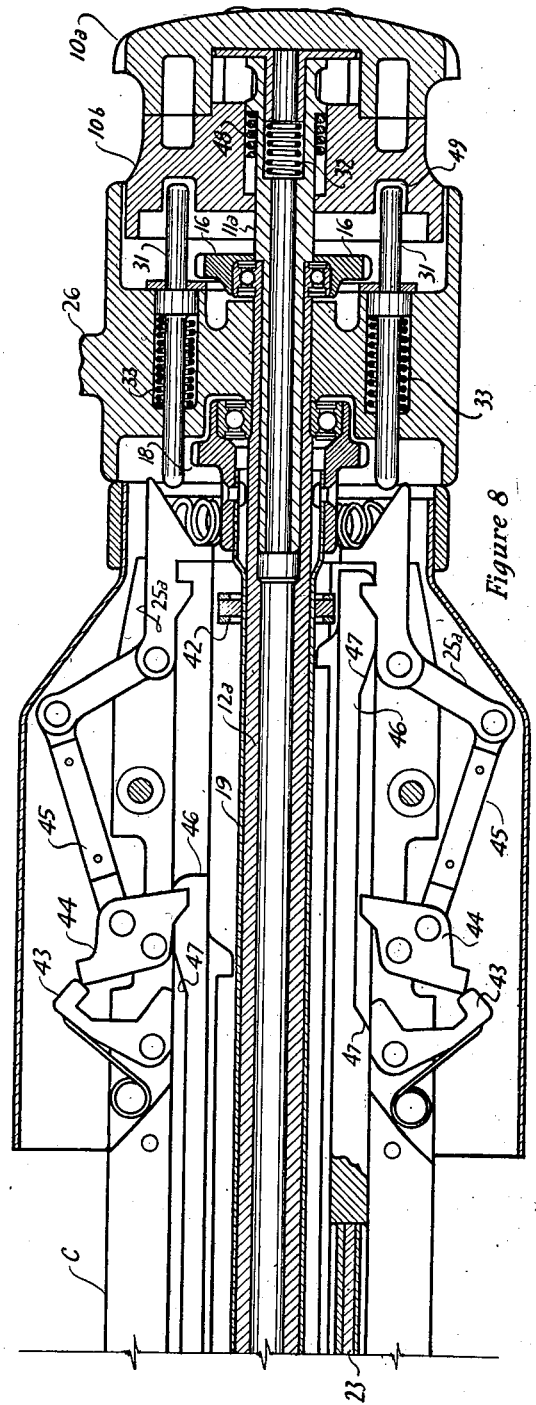
Figure 8 is an enlarged cross-sectional view as indicated by the line 3—3 of Figure 4 and illustrating another preferred feature of my invention.

In Figure 8 I have shown another very desirable feature which can be incorporated in the gun charger of my invention to adapt same for use with guns of various sizes. It is well understood by those skilled in the art, that guns of different calibers have different lengths of breech bolt travel, that is the travel of the breech bolt in a .50 caliber gun will be greater than that of a .30 caliber gun, and it is to the provision of a simple means which allows my invention to be used on guns of various sizes that this feature is directed.

The means which I propose for the accomplishment of this adaptation consists of a sear 43 and an auxiliary latch 44 pivotally attached to the support structure C. The auxiliary latch 44, by means of the link 45 is operably connected to the modified latch 25a such that when the latch 25a is engaged by the release plunger 31, the auxiliary latch 44 is disengaged from the slide rod 46 thus allowing the breech bolt of the gun to close. The slide rod 46, for use with this improved design, is slightly modified from that shown at 22 to provide cams 47 for operating the sear 43. It will, of course, be understood that the auxiliary latch 44 is located at a distance equal to that of the gun breech bolt travel from the forward position of the dog 20 and that this auxiliary mechanism does not interfere with the operation of a larger size gun requiring the use of the latch 25a to maintain the breech bolt in its open position.

Figure 9:
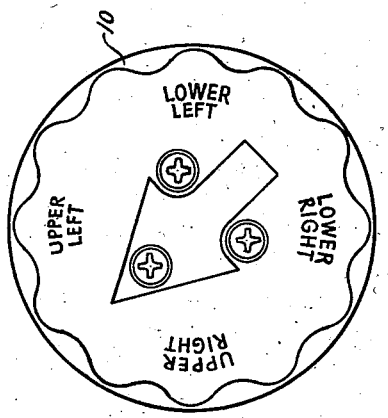
Figure 9 is an enlarged view of the selector dial showing the preferred method of indicating the position of the selector dial for engaging the various guns.
Figure 7:
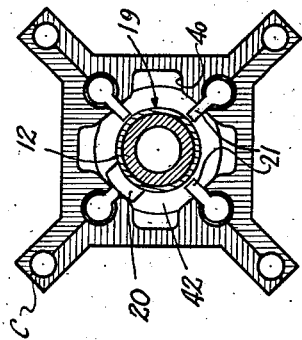
Figure 7 is an enlarged cross-sectional view as indicated by the line 7—7 of Figure 2.

As a resume of the operation of this invention, it is assumed that it is desired to charge the upper left gun. The selector dial 10 is pulled back slightly against the action of the spring 48 to disengage the stop 30 on the cam 29 from the release plunger 31 and is then rotated until the upper left gun is shown at the top of the selector dial 10, as pictured in Figure 9. The charger handle A is then pulled back to its most rearward position at which time the gun will be completely cleared; the reciprocable breech bolt being retained in its rearward position due to the latch 25 engaging the groove 24 on the slide rod 22. The charger head unit B can then be returned to its forward position. To release the breech bolt and make ready for firing, it is only necessary for the operator to push forward on the selector dial 10, which in turn moves the release plunger 31 to disengage the latch 25 from the groove 24 on the slide rod 22. The breech bolt of the gun then moves forward to carry a loaded cartridge into the firing chamber. The gun is then charged and ready to be fired.

The remaining guns may be cleared, cleared of jam, or charged in the same manner, the selection of the desired gun being made on the selector dial 10.

It will be understood that, while I have described and shown herein a cable system for connecting the charging mechanism to the guns, I do not intende to limit myself to such means and that any other means such as linkage, etc., may be readily adapted thereto, depending on the requirements of the particular installation. It is to be noted that I have shown in Figure 8 a slightly simplified design for the spindle 11 and tube 12, same being indicated by the numerals 11a and 12a respectively. It is also to be noted that the selector dial is shown in its forward position as for releasing the breech bolt of one of the other guns for which the mechanism is not included, and clearly indicating the manner in which the groove 49 provides clearance for the other release plungers 31.

While this invention has been described in detail in its present preferred embodiment, it will be obvious to those skilled in the art, after understanding same, that various changes and modifications may be made therein without departing from the spirit and scope of the appended claims.

What I claim is:

1. A mechanism for the manual operation of the breech bolt of any one of a plurality of guns comprising a stationary frame, a member slidable in the frame, an operating handle affixed to the member, connecting means adapted to lead to each gun, rod elements forming terminals at one end of said connecting means, said rod elements slidably mounted in said frame, and rotatable selective means in said member for individually engaging said operating handle with any one of said connecting means.

2. A mechanism for the manual operation of the breech bolt of any one of a plurality of guns comprising a frame, a single operating handle, a head unit mounted on said frame, and an individual cable system slidably attached to said frame and adapted to lead to each gun, means for supporting said operating handle by the head unit and so adapted as to provide a mechanical advantage during the first increment of breech bolt travel, said head unit comprising selective means so constructed and arranged as to be rotatable relative to said operating handle whereby said operating handle may be mechanically connected with any one of said cable systems.

3. A mechanism for the manual operation of the breech bolt of any one of a plurality of guns comprising a stationary frame, a member slidable in the frame, an operating handle affixed to the member, connecting means adapted to lead to each gun, rod elements forming terminals at one end of said connecting means, said rod elements slidably mounted in said frame, latch means in said stationary frame for individually engaging said rod elements, release means in said member independent of said handle for releasing said rod elements and selective means in said member for individually engaging said release means and said operating handle with said connecting means.

4. A mechanism for the manual operation of the breech bolt of any one of a plurality of guns comprising a stationary frame, a member slidable in the frame, said slidable member being comprised of inner and outer tubes, the outer tube being rotatable upon the inner tube, a projecting lug on said outer tube, a head unit affixed to said member, an operating handle mounted upon said head unit, connecting means adapted to lead to each gun, rod elements forming terminals at one end of said connecting means and slidably mounted in said frame, projecting lugs on each of said rod elements, and selective means in said head unit operating to rotate the outer tube to individually engage the projecting lug thereon with the projecting lugs on said rod elements.

5. A mechanism for the manual operation of the breech bolt of any one of a plurality of guns comprising a stationary frame, a member slidable in the frame, a head unit attached to said member, an operating handle mounted on said head unit, connecting means adapted to lead to each gun, grooved end rod elements forming end terminals for said connecting means and slidably mounted in said frame, a plurality of latch means in said frame for each of said rod elements, release means mounted in said head unit for operating said latch means to release said rod elements, and selective means in said head unit whereby said release means and said operating handle may be operably engaged with any one of said connecting means.

6. A mechanism as set forth in claim 2, including a plurality of latch means in said frame for each cable system and release means mounted in said head unit and associated with said selective means for operating said latch means.

7. A mechanism as set forth in claim 1, including latch means in said stationary frame, said rod elements being provided with ends grooved for engagement by said latch means, and release means in said member and associated with said selective means for operating said latch means to disengage any one of said rod elements.

8. A mechanism for the manual operation of the breech bolt of any one of a plurality of guns comprising a stationary frame, a member slidable in the frame, said slidable member being comprised of inner and outer tubes, the outer tube being rotatable upon the inner tube, a projecting lug on said outer tube, a head unit affixed to said member, an operating handle mounted upon said head unit, connecting means adapted to lead to each gun, grooved end rod elements forming end terminals for said connecting means and slidably mounted in said frame, projecting lugs on each of said rod elements, latch means located in said stationary frame for engaging said grooved end rod elements, release means incorporated in said head unit for operating said latch means, and selective means in said head unit and operating to rotate the outer tube to individually engage the projecting lug thereon with the projecting lugs on said rod elements.

THOMAS WM. GASSER.